US009777585B2

(12) United States Patent
Drane

(10) Patent No.: US 9,777,585 B2
(45) Date of Patent: Oct. 3, 2017

(54) GUIDE VANE ASSEMBLY

(71) Applicant: ROLLS-ROYCE PLC, London (GB)

(72) Inventor: Andrew James Drane, St. George Bristol (GB)

(73) Assignee: ROLLS-ROYCE plc, London (GB)

( * ) Notice: Subject to any disclaimer, the term of this patent is extended or adjusted under 35 U.S.C. 154(b) by 543 days.

(21) Appl. No.: 13/967,804

(22) Filed: Aug. 15, 2013

(65) Prior Publication Data
US 2014/0064956 A1    Mar. 6, 2014

(30) Foreign Application Priority Data

Sep. 6, 2012  (GB) .................................. 1215906.7

(51) Int. Cl.
| | |
|---|---|
| *F03B 3/18* | (2006.01) |
| *F01D 9/04* | (2006.01) |
| *F04D 29/02* | (2006.01) |
| *F04D 29/54* | (2006.01) |
| *F01D 25/24* | (2006.01) |

(Continued)

(52) U.S. Cl.
CPC .............. *F01D 9/042* (2013.01); *F01D 5/282* (2013.01); *F01D 9/041* (2013.01); *F01D 25/246* (2013.01); *F04D 29/023* (2013.01); *F04D 29/542* (2013.01); *F04D 29/544* (2013.01); *F04D 29/644* (2013.01); *F05D 2230/50* (2013.01); *F05D 2230/64* (2013.01); *F05D 2300/603* (2013.01); *F05D 2300/6034* (2013.01)

(58) Field of Classification Search
CPC ...... F01D 9/042; F04D 29/023; F04D 29/542; F04D 29/544
USPC .............................................. 415/209.3, 208.2
See application file for complete search history.

(56) References Cited

U.S. PATENT DOCUMENTS 2,848,156 A * 8/1958 Oppenheimer ....... F01D 11/001
                                                     415/108
3,501,090 A * 3/1970 Losee ..................... F01D 5/282
                                                     416/189

(Continued)

FOREIGN PATENT DOCUMENTS

| CA | EP 1762703 A2 * | 3/2007 | ............. F01D 9/042 |
|---|---|---|---|
| DE | 759514 C * | 4/1953 | ............. F01D 9/044 |

(Continued)

OTHER PUBLICATIONS

Jan. 10, 2013 Search Report issued in British Patent Application No. GB1215906.7.

(Continued)

*Primary Examiner* — Ngoc T Nguyen
(74) *Attorney, Agent, or Firm* — Oliff PLC

(57) ABSTRACT

A guide vane assembly for a stator vane stage comprises at least two aerofoil members joined together using a vane assembly attachment web. The vane assembly attachment web may be provided at the inner and/or outer radius of the aerofoil members. The vane assembly attachment web allows the guide vane assembly to be attached to an inner and/or outer attachment ring, thereby forming a stator vane stage. Such an arrangement may allow composite fiber reinforced guide vane assemblies to be readily assembled together to form stator vane stages. Stator vane stages that comprise such composite fiber reinforced guide vane assemblies may be lighter than conventional metallic stator vane stages.

15 Claims, 11 Drawing Sheets

(51) Int. Cl.
   *F04D 29/64* (2006.01)
   *F01D 5/28* (2006.01)

(56) References Cited

U.S. PATENT DOCUMENTS

| | | | | |
|---|---|---|---|---|
| 3,521,973 | A * | 7/1970 | Schouw | F04D 29/023 29/889.4 |
| 3,549,444 | A * | 12/1970 | Katz | B29C 53/564 156/175 |
| 3,556,675 | A * | 1/1971 | Howald et al. | F01D 5/225 415/144 |
| 3,883,267 | A * | 5/1975 | Baudier | F01D 5/282 416/230 |
| 3,997,280 | A * | 12/1976 | Germain | F01D 9/042 415/189 |
| 4,098,559 | A * | 7/1978 | Price | F01D 5/225 416/212 A |
| 4,305,696 | A * | 12/1981 | Pask | F01D 9/042 415/191 |
| 4,363,602 | A * | 12/1982 | Martin | F01D 5/282 416/230 |
| 5,273,401 | A * | 12/1993 | Griffin | F01D 5/282 416/193 R |
| 5,921,754 | A * | 7/1999 | Freitas | B29C 70/345 264/103 |
| 5,941,683 | A * | 8/1999 | Ridyard | F01D 25/162 415/142 |
| 6,196,794 | B1 * | 3/2001 | Matsumoto | B29C 65/5042 415/191 |
| 7,491,032 | B1 * | 2/2009 | Powell | F04D 29/023 29/889.71 |
| 8,157,507 | B1 * | 4/2012 | Coffin | F01D 5/26 415/119 |
| 8,905,719 | B2 * | 12/2014 | Kray | F01D 9/042 416/230 |
| 2002/0064456 | A1 | 5/2002 | Marlin et al. | |
| 2003/0185673 | A1 * | 10/2003 | Matsumoto | F01D 5/282 415/159 |
| 2003/0206799 | A1 * | 11/2003 | Scott | F01D 9/04 415/209.3 |
| 2011/0299976 | A1 * | 12/2011 | Uskert | F01D 5/225 415/173.1 |
| 2013/0149127 | A1 | 6/2013 | Hasting et al. | |
| 2013/0149130 | A1 | 6/2013 | Hasting et al. | |

FOREIGN PATENT DOCUMENTS

| | | | | |
|---|---|---|---|---|
| DE | WO 2008000014 | A2 * | 1/2008 | F01D 5/14 |
| FR | EP 0466602 | A1 * | 1/1992 | F01D 5/282 |
| GB | 1 534 525 | | 12/1978 | |
| SE | WO 2013095211 | A1 * | 6/2013 | F01D 25/162 |
| WO | 2013060977 | A2 | 5/2013 | |
| WO | 2013079860 | A1 | 6/2013 | |
| WO | 2013/133875 | A2 | 9/2013 | |

OTHER PUBLICATIONS

May 22, 2017 European Search Report issued in European Applicatino No. 13 18 0513.

* cited by examiner

GUIDE VANE ASSEMBLY

CROSS-REFERENCE TO RELATED APPLICATIONS

This application is based upon and claims the benefit of priority from British Patent Application Number 1215906.7, filed 6 Sep. 2012, the entire contents of which are incorporated by reference.

BACKGROUND OF THE INVENTION

1. Field of the Invention

The present invention relates to a guide vane assembly for a gas turbine engine. In particular, aspects of the invention relate to a composite guide vane assembly and arrangements for attaching composite guide vane assemblies to a gas turbine engine.

2. Description of the Related Art

An axially rotating gas turbine engine comprises a number of rotor stages and a number of stator stages, each comprising aerofoil members mounted around an engine axis. The rotor stages are arranged such that, in use, the aerofoil members rotate around the engine axis. The stator stages are arranged such that, in use, the aerofoil members are fixed in position around the engine axis. Conventionally, a gas turbine engine would have a compressor and a turbine, each of which would comprise at least one (and usually several) rotor and stator stages.

A cut-away diagram of an example of a turbofan (bypass) gas turbine engine 50 is shown in FIG. 1. The gas turbine engine 50 comprises, in axial flow series, a fan 12, a compressor 60, a combustor 15, and a turbine 70, the operation of each of which is well known. The compressor 60 and turbine 70 are conventionally referred to as being part of the core of the engine, and the flow from the fan that does not pass through the core of the engine is said to pass through a bypass duct 22.

The compressor 60 and turbine 70 both have rotor stages and stator stages. The fan 12 may be considered as a rotor stage. In the FIG. 1 example, a stator stage 32 is provided in the bypass duct 22 for the flow that does not pass through the core of the engine. This stator stage in the bypass duct 22 may be referred to as an outlet (or outer) guide vane (OGV) stage 32.

A more detailed view of an OGV stage 32 is shown in FIG. 2. Conventionally, OGVs are manufactured using a metal, including the aerofoil members (or vanes). The OGVs are conventionally manufactured as individual vanes, and an example of a conventional OGV 34 is shown in FIG. 3. Conventionally, the individual OGVs are mechanically fixed at their ends to an inner ring 37 and an outer ring 38 using a mechanical fastener 36, such as a bolt, in order to form the OGV stage 32 shown in FIG. 2. For example, the OGV 34 may be provided with a platform 35, at one or both of its ends, and the platform(s) may then be bolted to the inner and/or outer rings 37, 38. In the FIG. 3 example, a platform 35 is provided at an inner radius to bolt the OGV 34 to form the inner ring 37, but the OGV 34 is directly bolted to the outer ring 38 at the outer radius.

However, metallic OGVs 34 and the conventional arrangements for assembling metallic OGVs 34 to form an OGV stage 32 are very heavy.

It is desirable to replace the conventional metallic OGVs 34 with lighter components. In turn, this would result in a lighter OGV stage, and thus a lighter engine, and improved fuel consumption (or SFC).

It is proposed to use a composite structure rather than a metallic structure to form the OGVs. Such a composite structure may have sufficient strength, but considerably lower weight than a conventional metallic OGV. Composite OGVs may also be less expensive to manufacture than metallic OGVs.

However, conventional approaches to manufacturing/assembling an OGV stage may not be appropriate when using composite OGVs. For example, as mentioned above in relation to FIGS. 2 and 3, the conventional metallic OGVs 34 may have platforms 35 formed at either or both ends, and may be bolted to the inner and outer rings 37, 38 individually. Composite materials may not be well suited to such fixing arrangements. For example, bolting straight through composite material may be expensive/time-consuming and/or may significantly weaken the component. This may compromise the design and/or result in shorter life spans.

For example, in a flange-type fixing, bolting through flanges can introduce potential weak points in any resin rich areas and may add manufacturing complexity. Furthermore, drilling fixing holes through any loaded area of a composite structure is not desirable as it may introduce discontinuities to some of the fibres. Using a dovetail-type fixing may require a rapid build-up of thickness of the composite material, making the manufacturing process more complex and potentially introducing weakness at ply drop interfaces.

Although much of the discussion above and elsewhere herein focuses on OGVs, it will be appreciated that the same or similar considerations may apply to other stator stages and guide vanes therefor.

OBJECTS AND SUMMARY OF THE INVENTION

It is therefore desirable to use composite guide vanes (for example OGVs), and to be able to attach such composite guide vanes to an engine in a suitable manner.

According to an aspect of the invention there is provided a guide vane assembly for a gas turbine stator vane stage. The guide vane assembly comprises at least two adjacent aerofoil members (which may be referred to as vanes) extending from a root to a tip. The root to tip direction may be radial with respect to a rotational axis of the engine in use. The adjacent aerofoil members are integral with a vane assembly attachment web (which may, for example, be circumferentially extending) formed either between the tips or between the roots of the adjacent aerofoil members. A vane assembly attachment web may be formed between the roots and/or the tips of the adjacent aerofoil members. The adjacent aerofoil members and vane assembly attachment web are formed using a fibre-reinforced composite material. The vane assembly attachment web is constructed and arranged to allow the guide vane assembly to be fixed in position in the stator vane stage in use.

The guide vane assembly extends from a first end to a second end. Thus, the guide vane assembly may have a discreet length.

A first attachment flange may extend from the first end to the tip or root of an aerofoil member. A second attachment flange may extend from the second end to the tip or root of another aerofoil member. The guide vane assembly may extend from each end in a substantially circumferential direction. The attachment flange may be located at the opposite end of the aerofoil member to the end at which the vane assembly attachment web is formed. Thus, the or each attachment flange may be formed either at an inner radius (or root) or an outer radius (or tip). The first and/or second attachment flanges may be arranged to locate and/or fix the guide vane assembly in the stator vane stage in use. The attachment flanges may be shaped to correspond to a respective attachment ring, so as to allow, in use, the attachment flange to be located at and fixed to the respective attachment ring.

In such an arrangement having a first end and a second end, the circumferential extent of the guide vane assembly may be defined by the first and second ends. Thus, the angular extent of the guide vane assembly may be determined by (the angular position of) the first and second ends. In such an arrangement, the first and second end may be said to point away from each other and/or away from the rest of the guide vane assembly.

Alternatively, in an arrangement having a first end and a second end, the first and second ends may be within the circumferential extent of the guide vane assembly. Thus, the angular position of one or both of the ends of the assembly may be within the angular extent of the guide vane assembly. Thus, the first end and/or second ends may not define the angular extremities of the assembly. In such an arrangement, the first and second ends may be said to point towards each other, and/or towards the centre of the assembly.

In an arrangement having a first end and a second end, the composite structure may comprise fibres that extend continuously from the first end to the second end. Thus, at least some of the fibres may be unbroken from the first end to the second end. This may be a particularly strong and/or rigid arrangement.

Such an arrangement may allow the use of composite aerofoil members in a stator vane stage. The arrangement, including the vane assembly attachment web, may allow the aerofoil members to be attached to the engine (for example to a ring which may be also be a part of the stator vane stage) in a manner that retains the strength of the assembly, and is straightforward to manufacture and assemble.

The vane assembly attachment web may have radially inner and outer surfaces (one or both of which may be generally circumferentially extending). The radially inner and outer surface may be with respect to the engine axis, for example the rotational axis of the engine during use. One of the inner and the outer surfaces of the vane assembly attachment web may be shaped to correspond to an attachment ring (which may be referred to as a circumferential ring or a circumferential fixing ring) of the gas turbine engine so as to allow, in use, the guide vane assembly to be located and fixed to the attachment ring. The vane assembly attachment web may thus be arranged to abut an attachment ring of an engine thereby allowing the guide vane assembly to be fixed thereto to create a stator vane stage.

In the case of a vane assembly attachment web being formed at the tips of the adjacent aerofoil members, the radially outer surface of the vane assembly attachment web may be shaped to correspond to an outer ring of the gas turbine engine. In the case of a vane assembly attachment web being formed at the roots of the adjacent aerofoil members, the radially inner surface of the vane assembly attachment web may be shaped to correspond to an inner ring of the gas turbine engine.

The guide vane assembly (which may be referred to as a stator vane assembly, the two terms being interchangeable herein) may comprise one or more than one vane assembly attachment web. For example, the same two adjacent aerofoil members may have a vane assembly attachment web between both their roots and their tips. Alternatively or additionally, the guide vane assembly may comprise more than two aerofoil members, with each set of two adjacent aerofoil members having a vane assembly attachment web extending between their respective roots and/or their respective tips.

The guide vane assembly could be for any type of stator vane stage. For example, the guide vane assembly could be for a guide vane stage of a turbine or a compressor of a gas turbine engine. The guide vane assembly could be part of an outlet guide vane (OGV) stage. As discussed above, such OGVs may be formed in the bypass duct of a turbofan gas turbine engine, for example downstream of the fan in such an engine.

The guide vane assembly may be located and fixed to the attachment ring of the gas turbine engine using an attachment fixture.

The other of the radially inner and outer surfaces (i.e. the surface that is not shaped to correspond to an attachment ring) may be shaped to correspond to an attachment fixture. This may allow, in use, the guide vane assembly to be located and/or fixed between the attachment ring and the attachment fixture. The attachment fixture may itself be a ring, or a part of a ring, such as a ring segment.

The fibre-reinforced composite material may comprise fibres that pass radially (including substantially radially where used herein) through an aerofoil member. The fibres may then pass through the vane assembly attachment web, which may be, for example, in a circumferential (or substantially circumferential) direction. The fibres may then pass radially through the adjacent aerofoil member. The terms radial and circumferential (and axial) used herein are defined in relation to a rotational axis of a gas turbine engine in which the guide vane assembly is to be fitted/used.

Each aerofoil member of the guide vane assembly may have both a pressure surface and a suction surface. Both the pressure surface and suction surface of adjacent aerofoil members in the guide vane assembly may be formed using the same set of fibres. The same set of fibres may extend through the whole of both (or indeed all) of the aerofoil members in the guide vane assembly, as well as through the vane assembly attachment web(s).

In an alternative configuration to the guide vane assembly that extends from a first end to a second end, a guide vane assembly may form a continuous loop. As such, the adjacent aerofoil members may be integrally formed with a radially inner vane assembly attachment web and a radially outer vane assembly attachment web. Each of the radially inner vane assembly attachment web and the radially outer vane assembly attachment web may be as described above and elsewhere herein. The inner surface of the radially inner vane assembly attachment web may be shaped to correspond to an inner ring of a gas turbine engine. The outer surface of the radially outer vane assembly attachment web may be shaped to correspond to an outer ring of a gas turbine engine. In such an arrangement, the fibre-reinforced composite material may comprise fibres that are continuous around the loop. Thus, at least some of the fibres may be unbroken and/or extend continuously around the loop. This may be a particularly strong, and/or rigid arrangement.

A guide vane assembly may comprise any number of radially extending aerofoil members, which may be said to be circumferentially separated. For example, a guide vane assembly may comprise two and only two aerofoil members. Either a guide vane assembly in the form of a loop or a guide vane assembly having two ends may comprise two and only two aerofoil members.

Alternatively, a guide vane assembly may comprise more than two aerofoil members. For example, a guide vane assembly having two distinct ends may have more than two aerofoil members. By way of further example, a single guide vane assembly may comprise all of the aerofoil members of a given stator stage.

A guide vane assembly may extend around any angle around an axis, which axis may be collinear with an axis of a gas turbine engine to which it is attached. In a guide vane assembly that comprises all of the aerofoil members of a stator stage, the guide vane assembly may extend 360 degrees around its axis.

The guide vane assembly (for example at least a part of the aerofoil members) may comprise a protective coating. The protective coating may, for example, protect the aerofoil members/vanes against erosion, which may occur for example due to particle impact during use. The protective coating may be provided over a part or all of the assembly, for example a part or all of the aerofoil members. The coating may comprise, for example a fluoroelastomer, poly ether ether ketone and/or polyurethane.

At least a part of the outer surface of the assembly may be formed by a glass fibre skin (which may be woven). This may improve the impact toughness of the component. Additionally or alternatively, using a glass fibre skin on the vane assembly attachment web may help to provide galvanic insulation between the web and the component to which it is attached, for example if the web is a carbon composite structure and the component to which it is attached is metallic.

The aerofoil members may comprise a protective layer on the leading edge. Such a protective layer may or may not be in addition to any glass fibre skin provided to the assembly. This may provide additional protection against impact on the leading edge of the aerofoil member, for example due to foreign object strike, such as a bird strike. Such a protective layer may take any suitable form, such as a metallic strip.

According to an aspect, there is provided a stator vane stage for a gas turbine engine. The stator vane stage comprises at least one guide vane assembly as described above and elsewhere herein. The stator vane stages comprise inner and/or outer fixed rings located at the inner radius and outer radius of the aerofoil members respectively. Such inner and outer fixed rings may be referred to as inner and outer attachment rings. The stator vane stage also comprises inner and/or outer attachment fixtures. The or each vane assembly attachment web is used to attach the or each guide vane assembly either to the inner attachment ring using an inner attachment fixture or to the outer attachment ring using an outer attachment fixture.

The inner and/or outer attachment fixtures may be in the form of rings, or segments of rings. During assembly, the inner and/or outer attachment fixtures may be, for example, slid over their respective vane assembly attachment web. When assembled, the vane assembly attachment web may be located (for example trapped or clamped) between either the inner or outer fixing rings and the respective inner or outer attachment fixtures.

A stator vane stage may comprise more than one guide vane assembly. An advantage of such an arrangement may be that, in the event of damage to one of the guide vane assemblies (for example damage to one of the aerofoil members, for example foreign object damage), only the damaged guide vane assembly need be replaced. The rest of the stator vane stage may remain untouched. Thus, the costs associated with the repair/overhaul of the stator vane stage may be reduced, and/or the repair/overhaul process may be simplified.

One (or both, where both are present) of the inner attachment ring and the outer attachment ring may have a castellated shape. Such a castellated shape may have recesses and crests. Each recess may be shaped to accept a locating portion of a guide vane assembly. The locating portion may include at least the vane assembly attachment web or an attachment flange. The locating portion may also include a radially extending portion of adjacent aerofoil members. The other of the inner fixed ring and the outer attachment ring may also have a castellated shape, which may be described as having recesses and crests. Each recess may be shaped to receive one or more attachment flanges (which may be a circumferential attachment flange) of one or more guide vane assemblies. The attachment flange could be another vane assembly attachment portion (for example in the case that the guide vane assembly forms a continuous loop, with the adjacent aerofoil members integrally formed with a radially inner vane assembly attachment web and a radially outer vane assembly attachment web). Alternatively, the attachment flange could be a flange extending from the radially inner or radially outer end of an aerofoil section in a generally circumferential direction to an end of the guide vane assembly.

In such an arrangement, each crest of the castellated rings may form a gas-washed surface (which may be said to be circumferentially extending, i.e. a surface that extends in a substantially circumferential-axial direction) between aerofoil members. Such aerofoil members could belong to the same guide vane assembly or to different guide vane assemblies.

In arrangements in which the inner attachment ring has a castellated shape, the stator vane stage may comprise at least one inner attachment fixture. The inner attachment fixture may have at least one individual fixing element located within a corresponding recess of the inner attachment ring, and may have one or more circumferentially extending gas-washed surfaces that cover one or more of the recesses.

In arrangements in which the outer fixed ring has a castellated shape, the stator vane stage may comprise at least one outer attachment fixture. The outer attachment fixture may have at least one individual fixing element located within a corresponding recess of the outer fixed ring, and may have a (or more than one) circumferentially extending gas-washed surface that covers one or more of the recesses.

According to an aspect, there is provided an attachment fixture as described above and elsewhere herein. The attachment fixture may be an inner attachment fixture or an outer attachment fixture. The attachment fixture may thus be arranged to attach one or more guide vane assemblies in position, for example by trapping or clamping a vane assembly attachment web or an attachment flange between itself and an inner or outer fixed ring.

According to an aspect of the invention, there is provided a gas turbine engine comprising a guide vane assembly and/or a stator vane stage as described above and elsewhere herein.

BRIEF DESCRIPTION OF THE DRAWINGS

The invention will now be described, by way of example only, with reference to the accompanying Figures, in which.

DETAILED DESCRIPTION OF THE PREFERRED EMBODIMENTS

Figure 1:
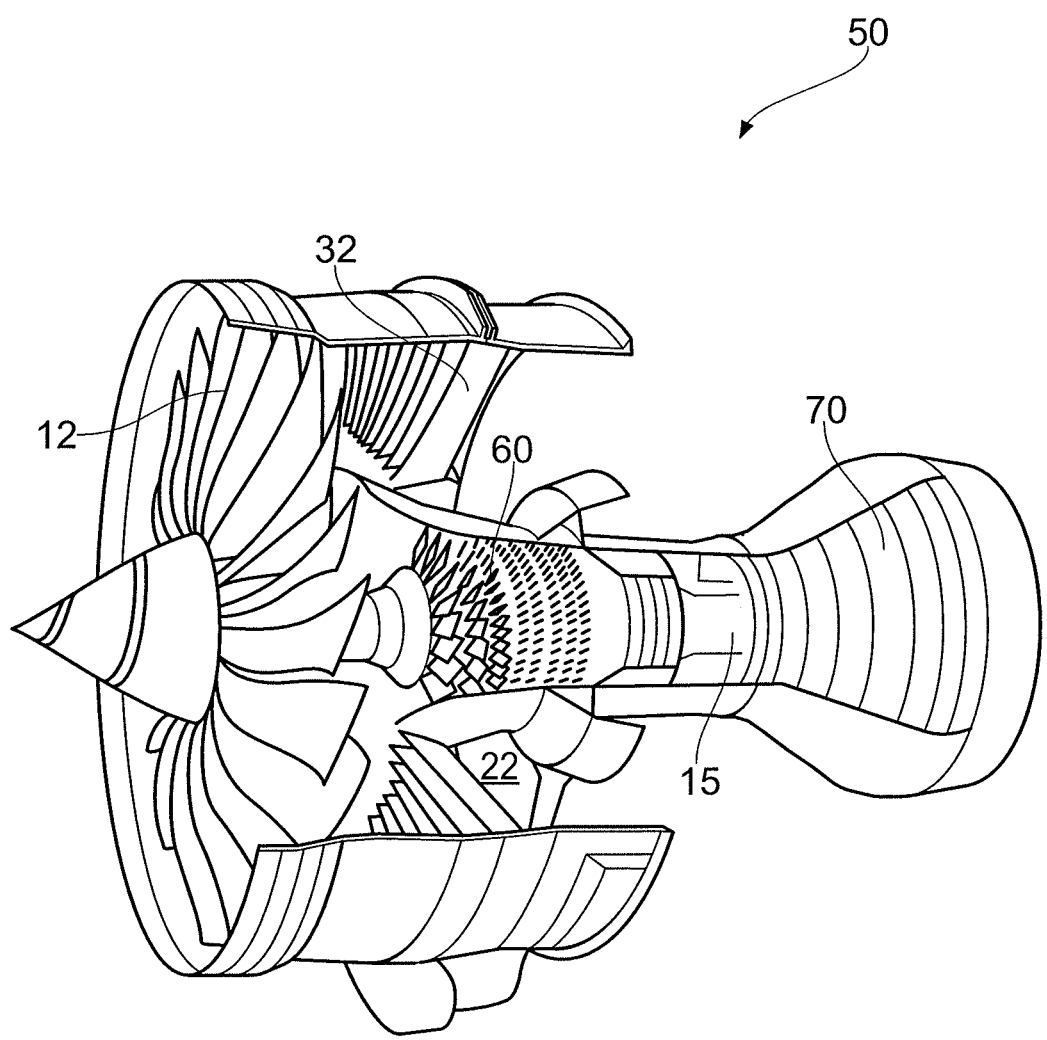
FIG. 1 shows a partially cut-away version of a gas turbine engine.
Figure 2:
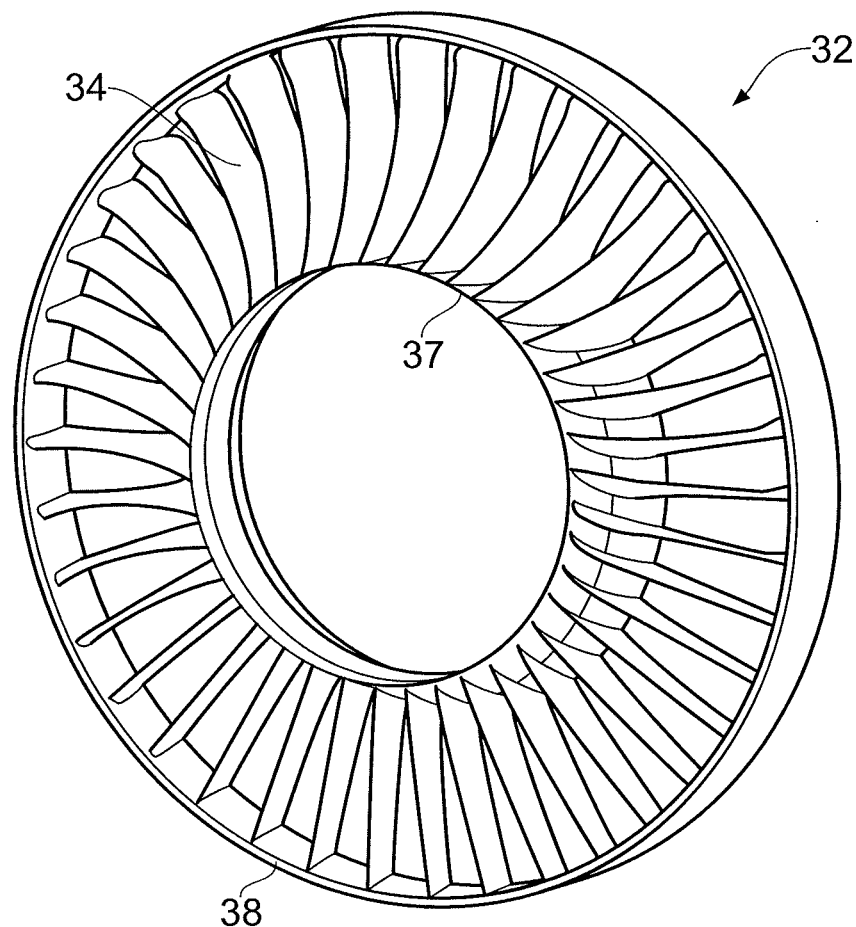
FIG. 2 shows a ring of outer (or outlet) guide vanes (OGVs) for a gas turbine engine.
Figure 3:
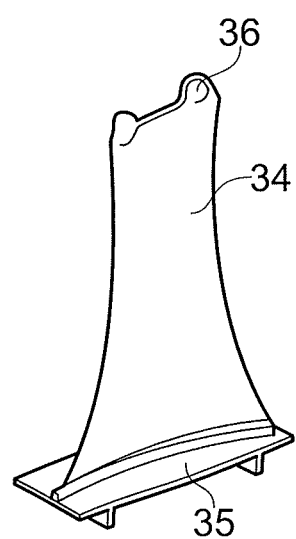
FIG. 3 shows a conventional individual OGV.
Figure 4:
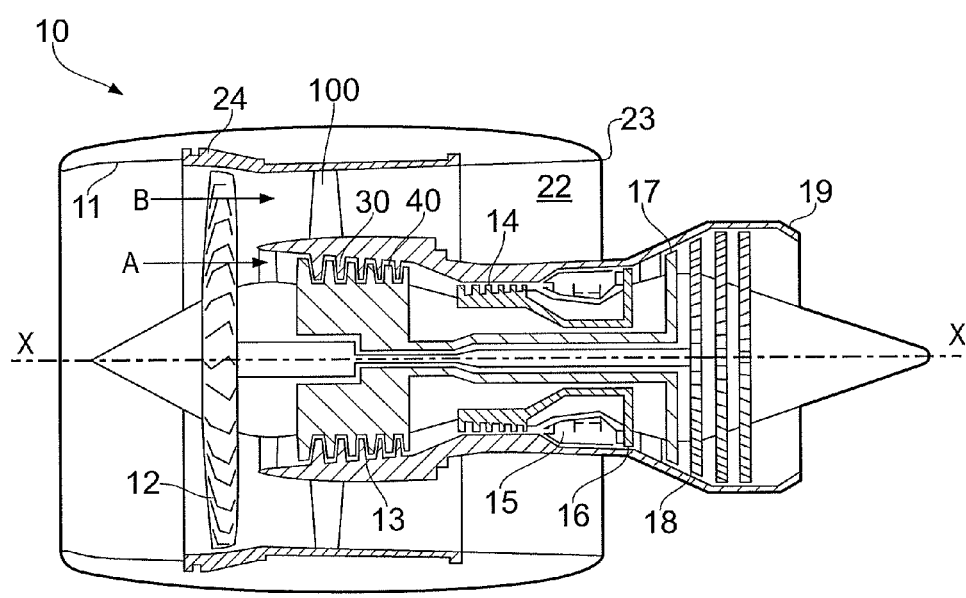
FIG. 4 shows a cross-section through a gas turbine engine.

With reference to FIG. 4, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The compressor and turbine each comprise rotor stages and stator stages. In FIG. 4, a stator stage is labelled 30 in the intermediate stage compressor 13 and a rotor stage is labelled 40. The engine 10 comprises an OGV stage 100.

The OGV stage 100 is in the bypass duct 22, which is a further example of a stator vane stage. In the FIG. 4 arrangement, the OGV 100 stage is located downstream of the fan 12, but in other arrangements an OGV stage 100 may additionally or alternatively be placed upstream of the fan 12 (although such a stator stage upstream of the fan 12 may be referred to as an inlet guide vane stage, rather than an outlet guide vane stage). The OGV stage 100 may, for example, be used to smooth and/or direct the flow in the bypass duct 22.

The OGV stage 100 comprises at least one guide vane assembly. For example, the OGV stage 100 may comprise a plurality of guide vane assemblies such as the guide vane assembly 110 shown in FIGS. 5 to 7, or the guide vane assembly 210 shown in FIGS. 8 to 10, or the guide vane assembly 310 shown in FIGS. 11 to 13, or the guide vane assembly 510 shown in FIG. 14. Each of these guide vane assemblies 110, 210, 310, 510 is discussed in greater detail below.

Figure 5:
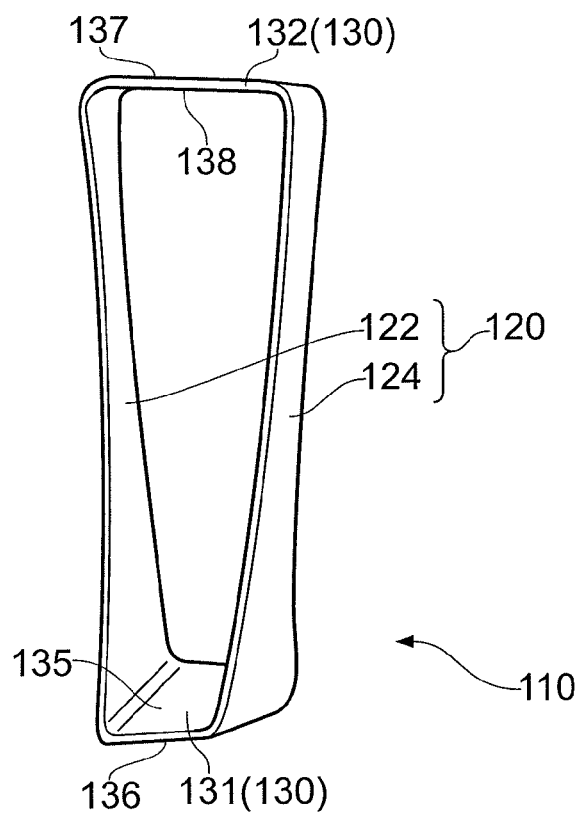
FIG. 5 shows a perspective view of a guide vane assembly.
Figure 6:
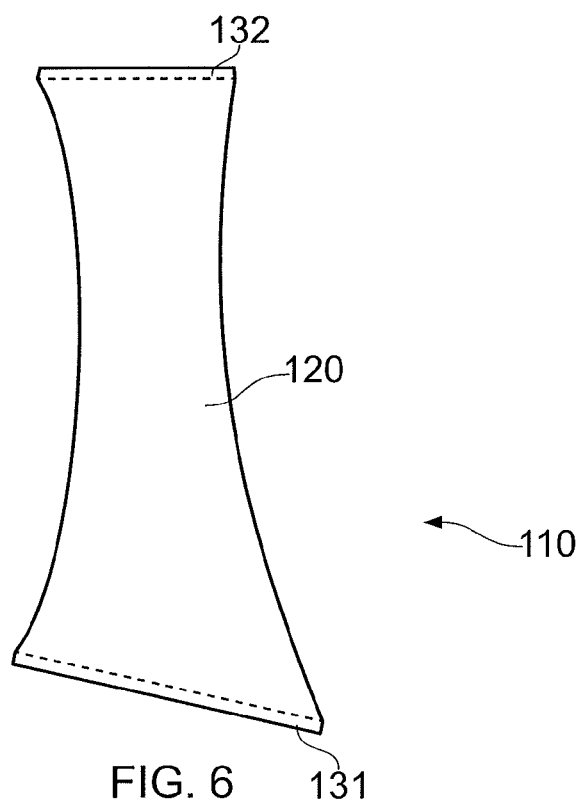
FIG. 6 shows a side view of the guide vane assembly shown in FIG. 5.
Figure 7:
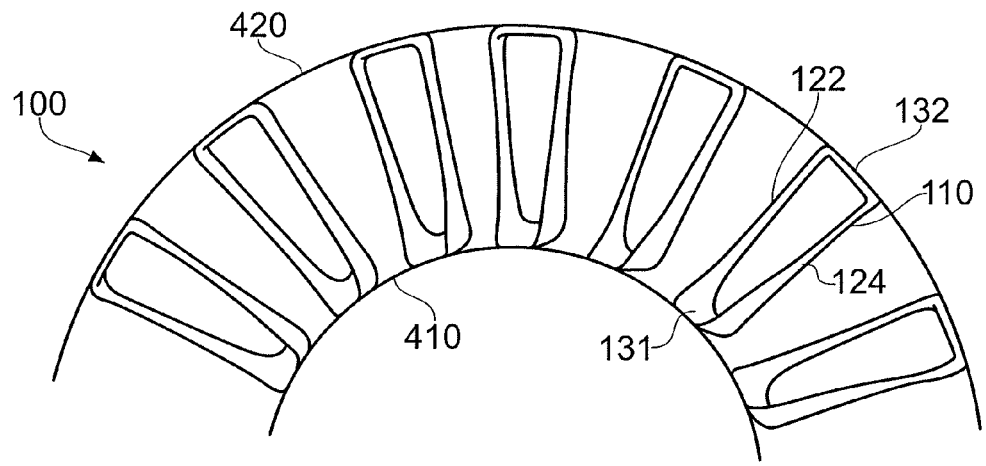
FIG. 7 shows a plurality of guide vane assemblies shown in FIG. 5 arranged in a ring.

Referring to FIGS. 5 to 7, the guide vane assembly 110 comprises two aerofoil members 122, 124, which together form a pair of aerofoil members 120. The guide vane assembly 110 of FIG. 4 comprises an inner vane assembly web 131 and an outer vane assembly web 132. One or both of the inner and outer vane assembly webs 131, 132 is a vane assembly attachment web 130.

The inner vane assembly web 131 has a radially inner surface 136 and a radially outer surface 135. The outer vane assembly web 132 also has a radially inner surface 138 and a radially outer surface 137.

The guide vane assembly 110 shown in FIGS. 5 to 7 may be said to have a box shape and/or may be described as being closed, or forming a closed loop. As such, the guide vane assembly 110 of FIGS. 5 to 7 may be continuous, with no start or end points.

Guide vane assemblies according to the invention, including the guide vane assemblies 210, 310 described herein, may comprise (and/or may be formed or manufactured using) a fibre-reinforced composite material, such as a fibre-resin composite. The fibre-reinforced composite material may be, for example, an organic matrix composite, such as a carbon fibre based composite. Any suitable method may be used to form the fibre-reinforced composite guide vane assemblies such as, for example, impregnating the fibres with the resin, forming the desired shape and then curing in an autoclave (a so-called "pre-preg" method), or a dry-fibre and resin-transfer method, or an Automated Fibre Placement (AFP) method.

Where the guide vane assembly 110, 210, 310 is manufactured using a resin transfer method using a dry fibre perform, the outer plies may, for example, be formed from a braided tube slid over the individual plies. This optional feature may provide a continuous outer layer with no ply edges, thereby reducing/substantially eliminating the possibility of delamination. Additionally or alternatively, dry fibre preforms could of have through thickness reinforcement added to the structure in the form of tufting or stitching, z-pinning and/or direct insertion.

The fibres in the guide vane assembly may be arranged in any manner, as desired. By way of example only, in the guide vane assembly 110 shown in FIGS. 5 to 7 at least some of the fibres may form a continuous loop around the box-shape. For example, at least some of the fibres may form a continuous loop that extends radially along each aerofoil member 122, 124, and along the inner and outer vane assembly webs 131, 132 between the aerofoil members. Such an arrangement may be particularly strong and/or may allow the shape of the guide vane assembly 110 to be retained during use. For example, the at least some of the fibres may be arranged so as to be aligned with the main load direction during use (which may be in the radial direction of the engine). Additionally or alternatively, the fibres may be aligned in other directions (such as at 45 degrees or 90 degrees to this direction), for example to provide strength on other directions, and/or chopped fibres may be used.

FIG. 7 shows a number of the guide vane assemblies 110 arranged together to form an OGV stage 100 (only a part of the OGV stage 100 is shown in FIG. 7). The OGV stage 100 also comprises an inner fixed ring 410 and an outer fixed ring 420, which may be referred to as inner and outer attachment rings 410, 420.

The inner vane assembly web 131 is shaped so as to be located on the inner fixed ring 410, thereby allowing the guide vane assembly 110 to be attached and/or connected to the inner fixed ring 410 using an appropriate attachment fixture (which may, for example, be as described elsewhere herein). For example, the radially inner surface 136 of the inner vane assembly web 131 may be shaped to correspond to the inner fixed ring 410. For example, the radially inner surface 136 of the inner vane assembly web 131 may be an annular segment or a frusto-conical segment and/or may comprise a locking feature that corresponds to a complimentary locking feature of the inner fixed ring 410. Such an arrangement may be provided to any example, such as those described herein in relation to other Figures.

Additionally or alternatively, the outer vane assembly web 132 may be shaped so as to be located on the outer fixed ring 420, thereby allowing the guide vane assembly 110 to be attached and/or connected to the outer fixed ring 420 using an appropriate attachment fixture. For example, the radially outer surface 137 of the outer vane assembly web 132 may be shaped to correspond to the outer fixed ring 420. For example, the radially outer surface 137 of the outer vane assembly web 132 may be an annular segment or a frusto-conical segment and/or may comprise a locking feature that corresponds to a complimentary locking feature of the inner fixed ring 410. Such an arrangement may be provided to any example, such as those described herein in relation to other Figures.

Any suitable number of guide vane assemblies 110 may be used to form the OGV stage 100. Typically, in any arrangement, at least some of the guide vane assemblies 110 in a stage 100 would be evenly spaced, such that the spacing between adjacent aerofoil members 122/124 of one guide vane assembly 110 is the same as the spacing between neighbouring guide vane assemblies 110. However, any other suitable spacing may be chosen, for example to account for asymmetric flow patterns created by upstream or downstream structures.

Figure 8:
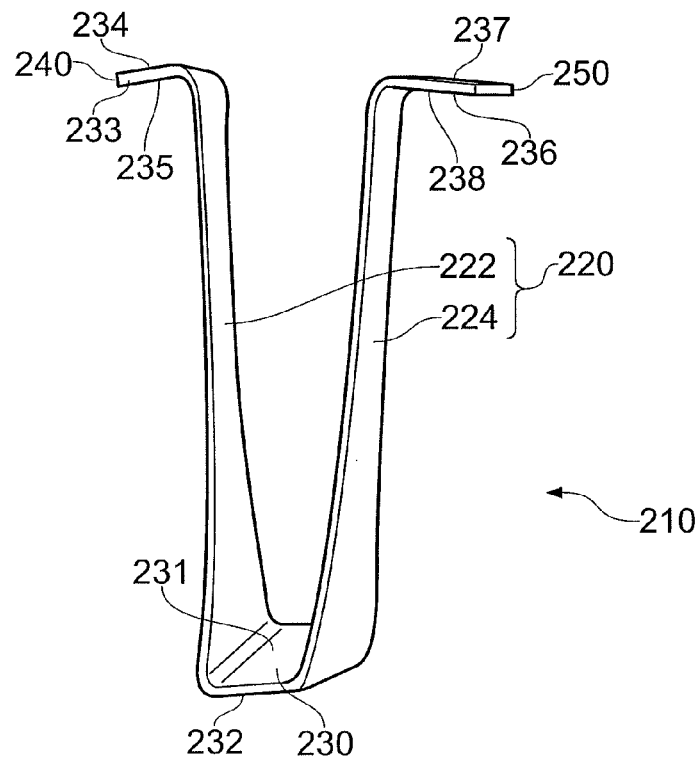
FIG. 8 shows a perspective view of a guide vane assembly according to an aspect of the invention.
Figure 9:
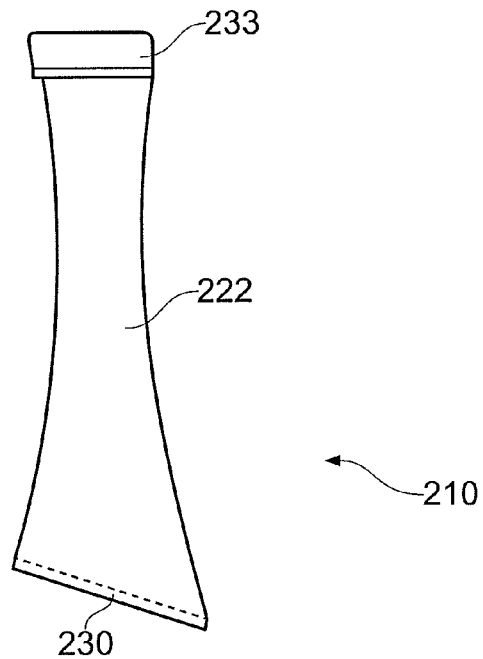
FIG. 9 shows a side view of the guide vane assembly shown in FIG. 8.

FIGS. 8 and 9 show a guide vane assembly 210 according an example of the invention. The guide vane assembly 210 of FIGS. 8 and 9 shares many features with the guide vane assembly 110 described above in relation to FIGS. 5, 6 and 7. Features of the guide vane assembly 110 of FIGS. 5, 6 and 7 that are compatible with the guide vane assembly 210 of FIGS. 8 and 9 may not be described in detail in relation to the FIGS. 8 and 9 example. For example, the aerofoil members 222, 224 and the vane assembly attachment web 230 in the FIGS. 8 and 9 example may be substantially the same as the aerofoil members 122, 124 and the vane assembly attachment web 131 respectively in the example of FIGS. 5 to 7, and the material/construction of the guide vane assembly 210 of FIGS. 8 and 9 may share features with the guide vane assembly 110 of FIGS. 5, 6 and 7.

A difference between the guide vane assembly 210 of FIGS. 8 and 9 and the guide vane assembly 110 of FIGS. 5, 6 and 7 is that the FIGS. 8 and 9 guide vane assembly has just one vane assembly attachment web 230, together with two attachment flanges 233, 236. The attachment flanges 233, 236 may extend in a substantially circumferential direction, as in the FIGS. 8 and 9 example. The two attachment flanges 233, 236 are provided at the (radially) opposite end of the aerofoil members 222, 224 to the vane assembly attachment web 230. In the FIGS. 8 and 9 example, the vane assembly attachment web 230 is provided at a radially inner end of the aerofoil members 222, 224 and the two attachment flanges 233, 236 are provided at the radially outer end of the aerofoil members 222, 224. However, other arrangements also in accordance with the invention may, by way of further example, have the vane assembly attachment web 230 provided at a radially outer end, and the two attachment flanges 233, 236 provided at a radially inner end.

The guide vane assembly 210 may be said to extend from a first end 240 to a second end 250. In the example of FIGS. 8 and 9, the guide vane assembly 210 extends from a first end 240 to a second end 250 via (in order) a first attachment flange 233, a first aerofoil member 222, a vane assembly attachment web 230, a second aerofoil member 224 and a second attachment flange 236. The guide vane assembly 210 may contain at least some fibres in the composite structure that extend continuously in this direction, from the first end 240 to the second end 250.

Figure 10:
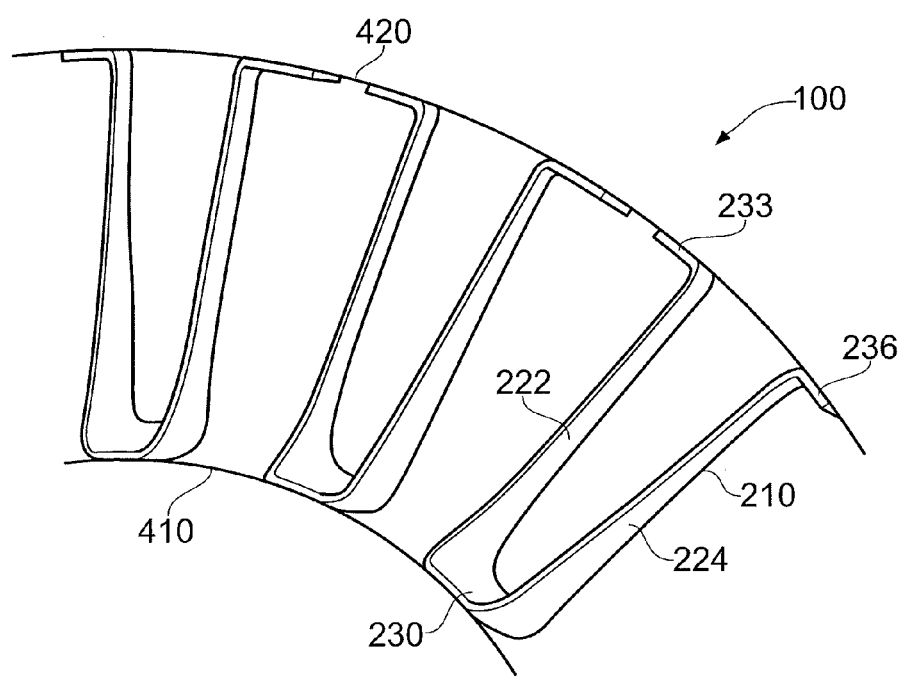
FIG. 10 shows a plurality of guide vane assemblies shown in FIG. 8 arranged in a ring.

FIG. 10 shows a number of the guide vane assemblies 210 of FIGS. 8 and 9 arranged together to form an OGV stage 100 (only a part of the OGV stage 100 is shown in FIG. 10). The OGV stage 100 also comprises an inner fixed ring 410 and an outer fixed ring 420, which may be as described above in relation to FIG. 7 and in greater detail elsewhere herein.

The vane assembly attachment web 230 is shaped so as to be located on the inner fixed ring 410, thereby allowing the guide vane assembly 210 to be attached and/or connected to the inner fixed ring 410 using an appropriate attachment fixture (which may, for example, be as described elsewhere herein). For example, the radially inner surface 232 of the vane assembly attachment web 230 may be shaped to correspond to the inner fixed ring 410. For example, the radially inner surface 232 of the vane assembly attachment web 230 may be an annular segment or a frusto-conical segment. In examples where the vane assembly attachment web 230 is attached to the outer fixed ring 420, the radially outer surface 231 of the vane assembly attachment web 230 may be shaped to correspond to the outer fixed ring 420.

The attachment flanges 233, 236 may be shaped so as to be located on the outer fixed ring 420, as in the FIG. 10 example, thereby allowing the guide vane assembly 210 to be attached and/or connected to the outer fixed ring 420 using an appropriate attachment fixture (which may, for example, be as described elsewhere herein). For example, the radially outer surfaces 234, 237 of the attachment flanges 233, 236 may be shaped to correspond to the outer fixed ring 420. For example, the radially outer surfaces 234, 237 of the attachment flanges 233, 236 may be annular segments or a frusto-conical segments. In examples where attachment flanges 233, 236 are provided at the radially inner ends of the aerofoil members 222, 224, the radially inner surfaces 235, 238 of the attachment flanges 233, 236 may be shaped to correspond to the inner fixed ring 41.

The attachment flanges 233, 236 of the guide vane assembly 210 of FIGS. 8 to 10 point away from each other, i.e. the first end 240 and the second end 250 are circumferentially outside of the aerofoil members 222, 224. However, other guide vane assemblies with first and second ends may be arranged differently. For example, the guide vane assembly 310 shown in FIGS. 11 to 13, which is in accordance with an example of the invention, has a first end 340 and a second end 350 that are circumferentially inside the aerofoil members 322, 324.

Figure 11:
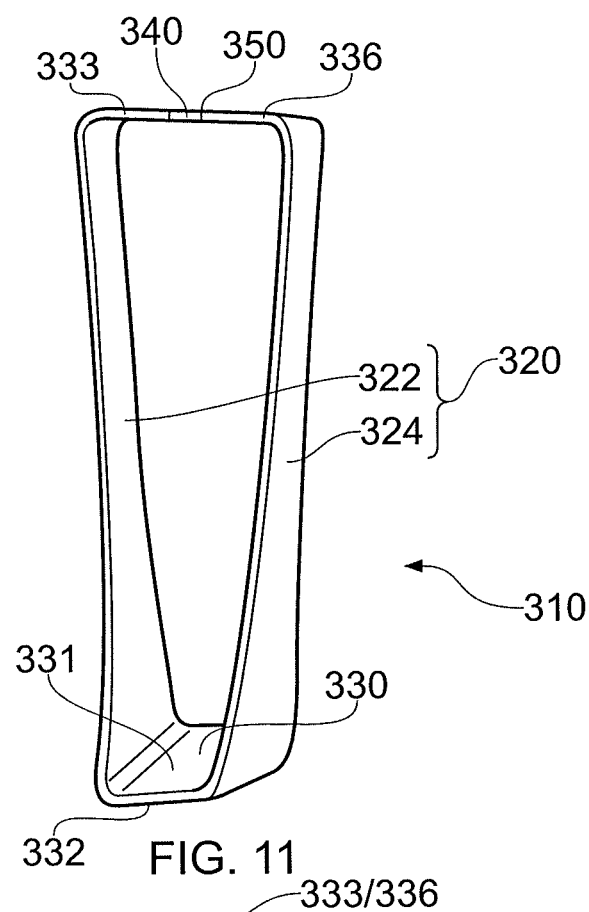
FIG. 11 shows a perspective view of a guide vane assembly according to an aspect of the invention.
Figure 12:
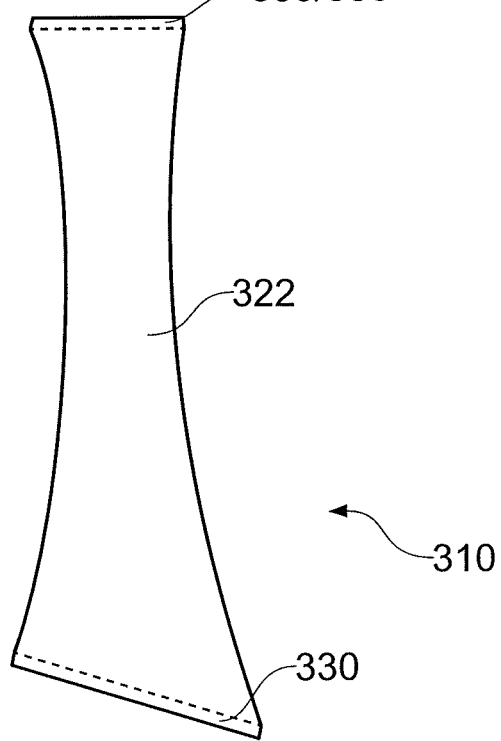
FIG. 12 shows a side view of the guide vane assembly shown in FIG. 11.
Figure 13:
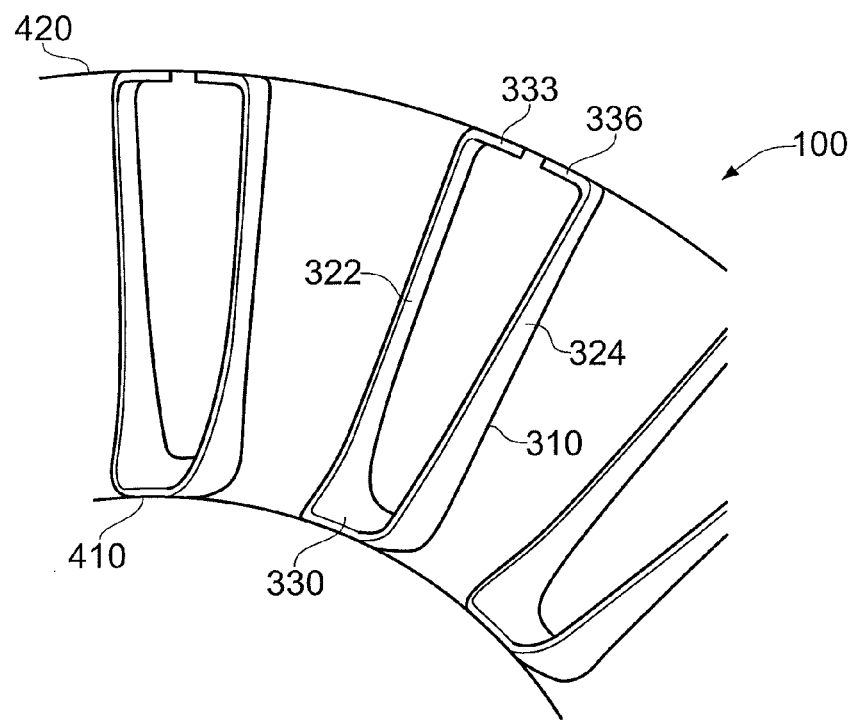
FIG. 13 shows a plurality of guide vane assemblies shown in FIG. 11 arranged in a ring.

The guide vane assembly 310 shown in FIGS. 11 to 13 has two attachment flanges 333, 336 that point towards each other. In at least some other aspects, the guide vane assembly 310 of FIGS. 11 to 13 may be the same as the guide vane assembly 210 described above in relation to FIGS. 8 to 10. Thus, the function and/or construction and/or arrangement and/or operation of any or all of the aerofoil members 322, 324, vane assembly attachment web 330 and the attachment flanges 333, 336 may be the same for the guide vane assembly 310 shown in FIGS. 11 to 13 and the guide vane assembly 210 shown in FIGS. 8 to 10 (other than the direction in which the attachment flanges 333, 336 point). Similarly, any possible modifications to the guide vane assemblies 210, 310 apply to both the example shown in FIGS. 8 to 10 and the example shown in FIGS. 11 to 13. As such, the features of the guide vane assembly 310 of FIGS. 11 to 13 will not be described in detail herein.

Figure 14:
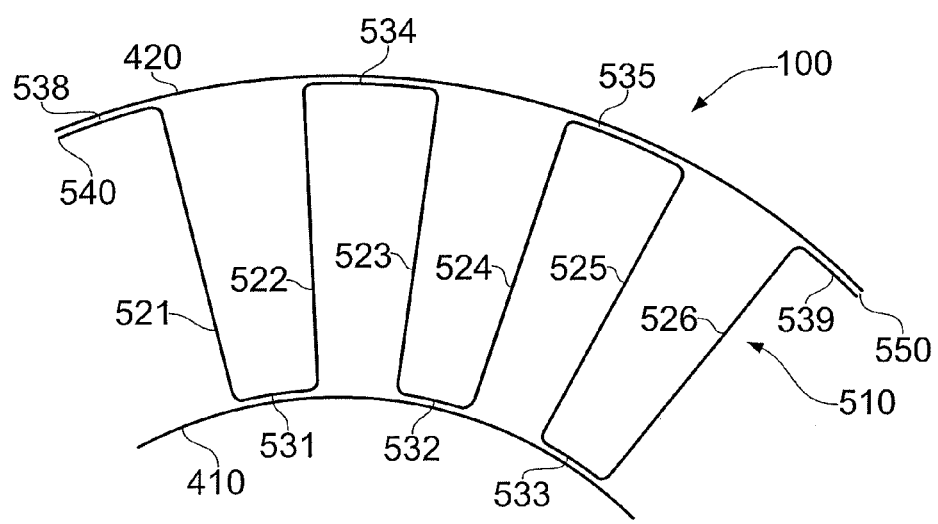
FIG. 14 shows a front (axial) view of a guide vane assembly according to an aspect of the invention.

FIG. 14 shows an example of another guide vane assembly 510 according to the invention. A guide vane assembly according to the invention may comprise two or more than two aerofoil members. In the case of the FIG. 14 example, the guide vane assembly 510 comprises six aerofoil members 521, 522, 523, 524, 525, 526, but other guide vane assemblies according to the invention may comprise different numbers of aerofoil members.

The guide vane assembly 510 of FIG. 14 comprises five vane assembly attachment webs, each extending between adjacent aerofoil members, including three inner vane assembly attachment webs 531, 532, 533 and two outer vane assembly attachment webs 534, 535. Of course, other arrangements may have different numbers of vane assembly attachment webs. The vane assembly attachment webs 531-535 may be substantially as described elsewhere herein.

The guide vane assembly 510 of FIG. 14 extends from a first end 540 to a second end 550. At least some fibres may run continuously along the guide vane assembly 510 from the first end 540 to the second end 550. The FIG. 14 example is provided with attachment flanges 538, 539 that extend from each end 540, 550. Again, the attachment flanges 538, 539 may be substantially the same as the attachment flanges described elsewhere herein, for example with reference to FIGS. 8 to 13. Although the attachment flanges 538, 539 are shown at a radially outer end of the aerofoil members 521-526 of the guide vane assembly 510, one or more of the attachment flanges 538, 539 may alternatively be provided at a radially inner end (or the guide vane assembly 510 may comprise no attachment flanges and simply terminate at radially inner or outer ends). The guide vane assembly 510 may be attached to inner and outer attachment rings 410, 420, using one or more of the vane assembly attachment webs 531-535 and/or the attachment flanges 538, 539, as described elsewhere herein for example.

It will be appreciated that guide vane assemblies according to the invention may take many different forms, which are not limited to those described above by way of example in relation to FIGS. 8 to 14 (and elsewhere herein). For example, a guide vane assembly may comprise a single vane assembly attachment web 130, 230, 330 at a radially inner or radially outer end, but with no attachment flange or further vane assembly attachment web at the other radial end of the aerofoil members. In such an arrangement, the aerofoil members may simply terminate at a radial end, and a suitable attachment fixture may be used to hold them in position in an assembled stator vane stage.

Note that in the examples of the stator vane stages 100 shown in FIGS. 7, 10, 13 and 14, the inner attachment ring 410 and outer attachment ring 420 are not shown in any detail, and are merely used to indicate the arrangement of the guide vane assemblies 110, 210, 310, 510 in the stator vane stage 100. The attachment of the guide vane assemblies 110, 210, 310, 510 in the stator vane stage 100, including the inner and outer attachment rings 410, 420 is shown in more detail in FIGS. 15 to 20.

Figure 15:
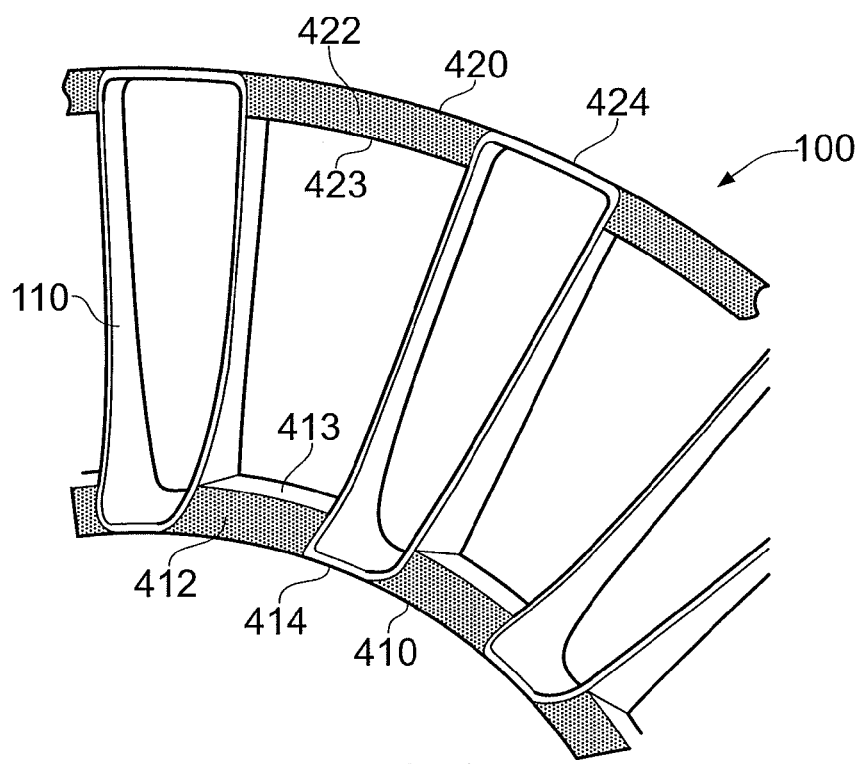
FIG. 15 shows guide vane assemblies as shown in FIG. 5 forming part of a ring and being located in position by profiled rings.
Figure 16:
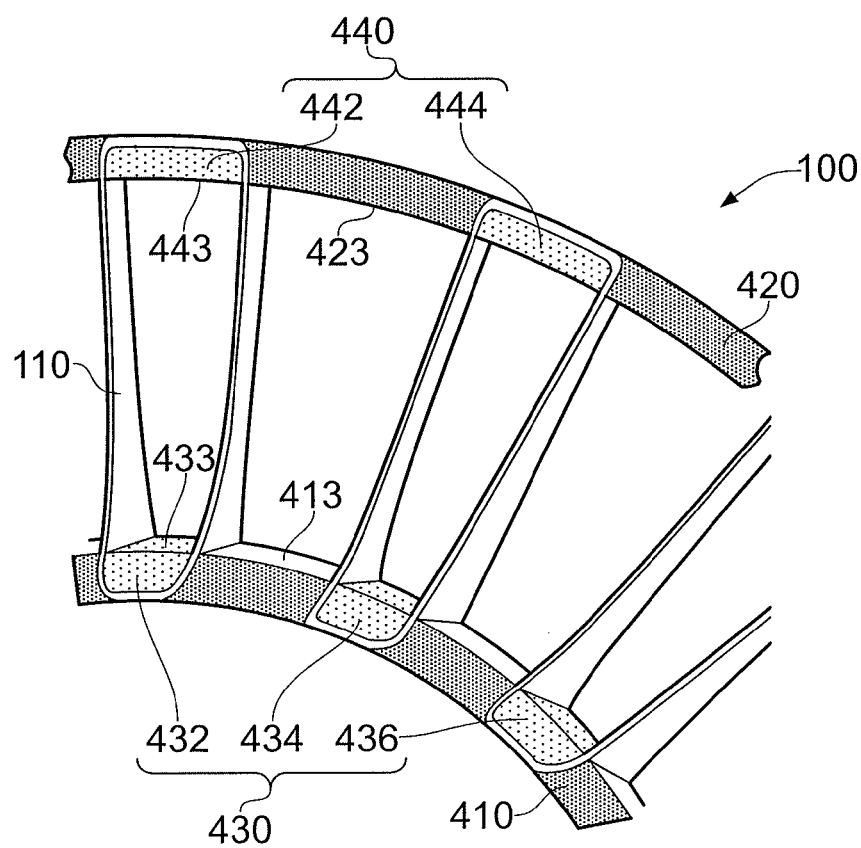
FIG. 16 shows guide vane assemblies as shown in FIG. 5 fixed in part of a ring using attachment fixtures.

FIG. 15 shows an example of inner and outer attachment rings 410, 420 (which may be referred to as inner and outer fixed rings 410, 420) in greater detail. Both the inner fixed ring 410 and the outer fixed ring 420 have castellated shapes with crests 412, 422 and troughs 414, 424. In the example of FIGS. 15 and 16, a box-type guide vane assembly 110 such as that described above in relation to FIGS. 5-7 is shown. The vane assembly attachment webs 131, 132 are located/positioned in the respective troughs 414, 424. Thus, each guide vane assembly 110 may be said to be held between adjacent crests (or castellations) 412, 422 in the inner and outer fixed rings 410, 420.

Each of the inner fixed ring 410 and the outer fixed ring 420 may be a continuous structure, for example a loop-shaped structure. Alternatively, the inner fixed ring 410 and/or the outer fixed ring 420 may comprise multiple parts, each one comprising one or more crests 412, 422 and troughs 414, 424 and extending around a circumferential segment.

FIG. 16 shows the arrangement of FIG. 15, but with an inner attachment fixture 430 and an outer attachment fixture 440. The guide vane assembly 110 may be clamped by (for example between) the inner attachment fixture 430 and the inner attachment ring 410. A radially inner portion (or locating portion) of the guide vane assembly 110 may be located and/or fixed/clamped between the inner attachment fixture 430 and a trough 414 of the inner fixed ring 410, as in the example shown in FIG. 16. The clamped radially inner portion of the guide vane assembly 110 may comprise, for example, a vane assembly attachment web 130 and/or a radially inner portion of the aerofoil members 120.

Similarly, the guide vane assembly 110 may be clamped by (for example between) the outer attachment fixture 440 and the outer attachment ring 420. A radially outer portion of the guide vane assembly 110 may be located and/or fixed/clamped between the outer attachment fixture 440 and a trough 424 of the outer fixed ring 420, as in the example shown in FIG. 16. The clamped radially outer portion of the guide vane assembly 110 may comprise, for example, a vane assembly attachment web 130 and/or a radially outer portion of the aerofoil members 120.

Figure 17:
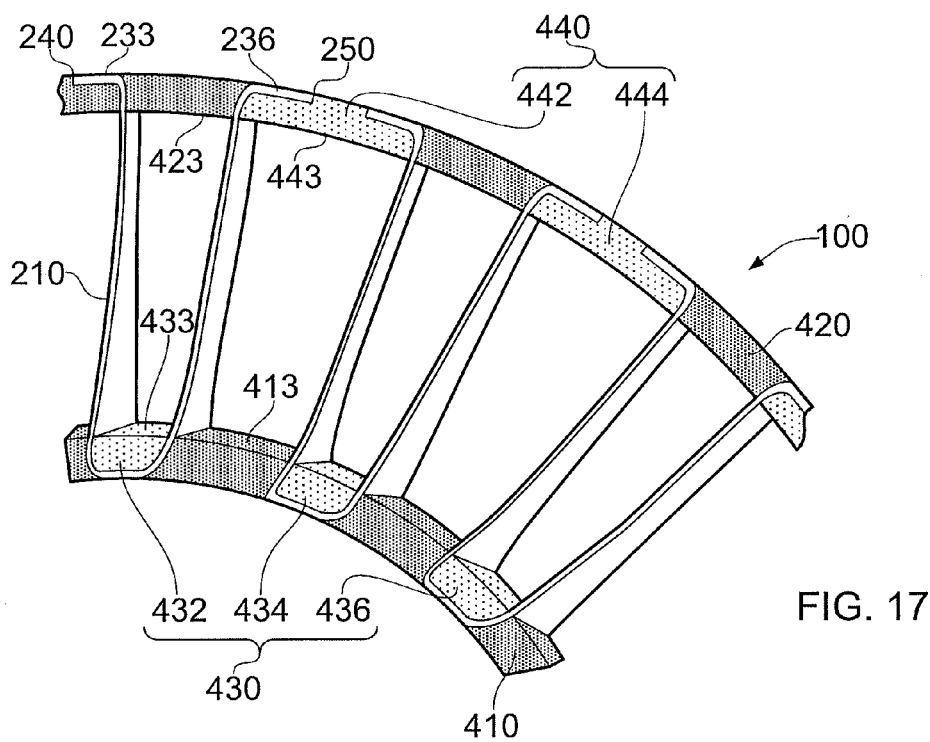
FIG. 17 shows guide vane assemblies as shown in FIG. 8 fixed in part of a ring using attachment fixtures.
Figure 18:
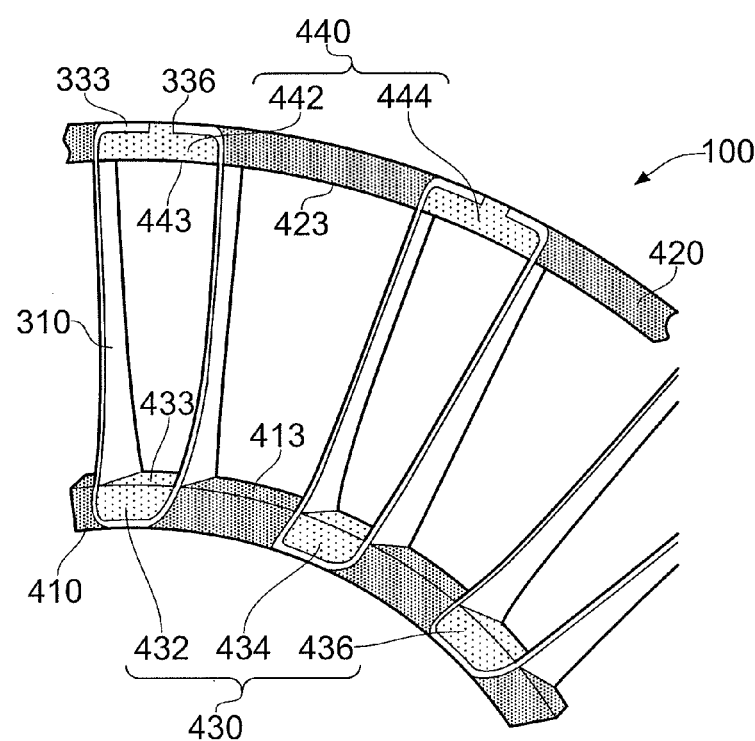
FIG. 18 shows guide vane assemblies as shown in FIG. 11 fixed in part of a ring using attachment fixtures.

The attachment rings 410, 420 and attachment fixtures 430, 440 are shown in FIGS. 15 and 16 in relation to the continuous (or "box-type") example of a guide vane assembly 110, such as the one shown in FIGS. 5 to 7. However, suitable attachment rings and/or attachment fixtures could be used to assemble any guide vane assemblies together in order to produce a stator vane stage 100, such as an OGV stage. For example, FIGS. 17 and 18 show examples of guide vane assemblies 210, 310 extending from a first end 240, 340 to a second end 250, 350 (such as those shown in FIGS. 8 to 13), the guide vane assemblies being assembled together using attachment rings 410, 420 and attachment fixtures 430, 440. In these examples, neighbouring attachment flanges 233, 333, 236, 336 may be clamped using an element 432, 434, 436, 442, 444 of an attachment fixture 430, 440. The neighbouring attachment flanges 333/233, 336, 236 may be from the same guide vane assembly 310 (as in the example shown in FIG. 18), or from neighbouring guide vane assembles 210 (as in the example shown in FIG. 17).

Figure 19:
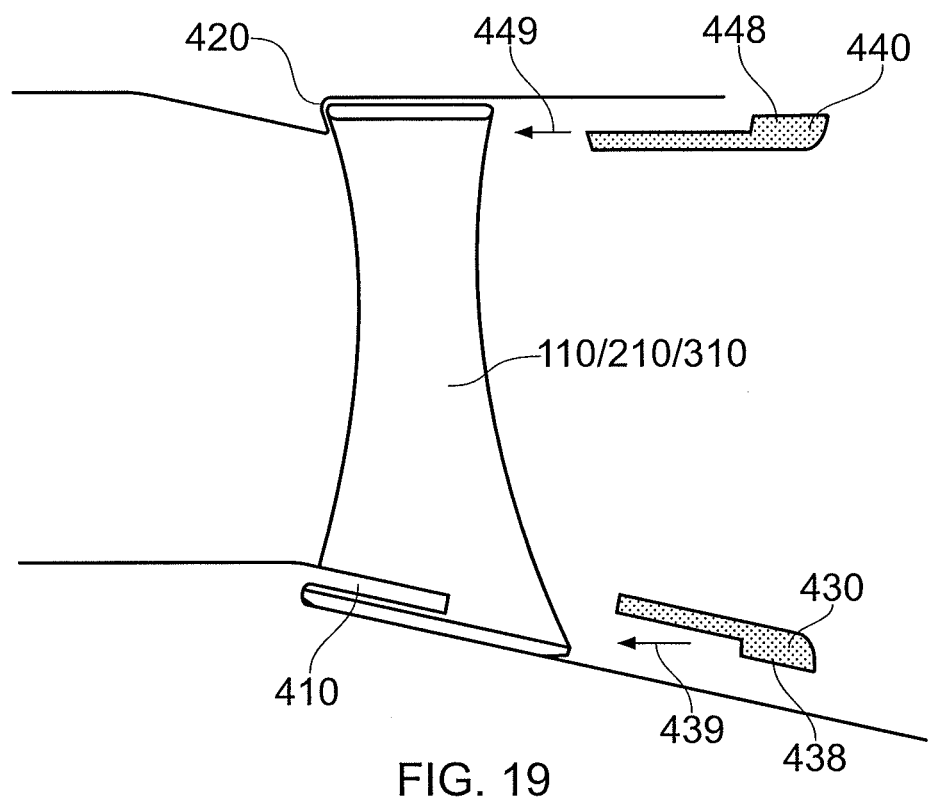
FIG. 19 shows an example of attachment fixtures used to fix a guide vane assembly in position.

Examples of inner and outer attachment fixtures 430, 440 are shown in side cross section (i.e. a cross section using a plane that is parallel to, and contains, the engine axis) in FIG. 19. The inner and outer attachment fixture 430, 440 shown in FIG. 19 may be examples of the attachment fixtures 430, 440 shown in FIGS. 16 to 18. FIGS. 16 to 18 show a cross-section through a portion of the stator vane stage 100 in an isometric view. During assembly, the attachment fixtures 430, 440 may be slid into position in order to hold one or more guide vane assemblies 110, 210, 310 in position. The attachment fixtures 430, 440 may be slid axially in order to hold the one or more guide vane assemblies 110, 210, 310 in position, as illustrated by the arrows 439, 449 in FIG. 19.

In the examples shown in FIGS. 16 to 19, the attachment fixtures 430, 440 may be circumferential loops, or hoops. Alternatively, the attachment fixtures 430, 440 may be segments of circumferential loops, or hoops. Thus, the inner attachment fixture 430 may comprise one or more individual fixing element 432, 434, 436 and/or the outer attachment fixture 440 may comprise one or more individual fixing element 442, 444. In this regard, each individual fixing element 432, 434, 436, 442, 444 may be shaped/arranged to fit into a corresponding trough in the respective attachment ring 410, 420.

Each individual fixing element 432, 434, 436, 442, 444 of the attachment fixtures 430, 440 may have a protrusion 438, 448 configured to hold the respective guide vane assembly 110, 210, 310 in position, as in the FIG. 19 example. The protrusion 438, 448 may be radially extending, and/or located at the same axial end from which the attachment fixture 430, 440 is slid into position (this direction being shown by arrows 439, 449 in FIG. 19). In this way, the protrusion 438, 439 may hold the respective guide vane assembly 110, 210, 310 in position axially.

When assembled in a gas turbine engine, the attachment rings 410, 420 and the attachment fixtures 430, 440 may cooperate with a further component of the engine (not shown) in order to ensure that the guide vane assemblies 110, 210, 310 are held, or locked in place. Purely by way of example, a further component may abut, or lock against, one or more attachment fixtures 430, 440 in order to hold it in position axially. Alternatively, dedicated fixings (such as threaded fixings, such as bolts) could be used to fix the attachment fixtures 430, 440 in place once they have been located in the correct position during assembly.

The attachment rings 410, 420 and the attachment fixtures 430, 440 may be made from any suitable material, including, for example metal and/or composite, such as fibre (for example organic fibre) and resin composite material, for example fibre reinforced organic matrix material or compression moulding compound.

Figure 20:
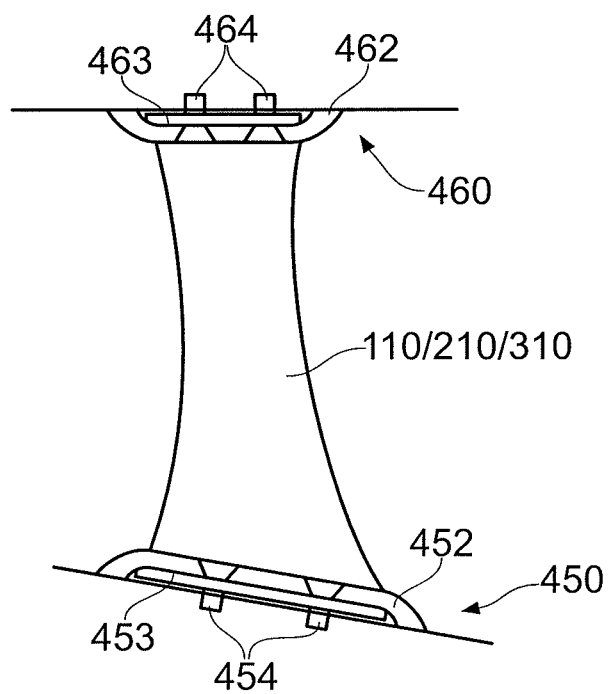
FIG. 20 shows an example of alternative attachment fixtures used to fix a guide vane assembly in position.

As mentioned elsewhere, any suitable apparatus and/or method could be used to assemble the guide vane assemblies 110, 210, 310 together to form a stator vane stage 100. One such apparatus/method (and variants thereof) is described above in relation to FIGS. 16 to 19. By way of further example, the guide vane assemblies 110, 210, 310 may be bolted into position, for example as shown in FIG. 20. In FIG. 20, a guide vane assembly 110, 210, 310 is attached to an attachment ring using a radially inner attachment fixture 450 and a radially outer attachment fixture 460. Each of the radially inner attachment fixture 450 and the radially outer attachment fixture 460 comprises a bracket 452, 462. Each bracket 452, 462 has a bearing surface 453, 463 that engages either a vane assembly attachment web 131 or one or more attachment flanges 233, 236, 333, 336. Each bracket 452, 462 is secured in position using one or more fasteners 454, 464. The fasteners 454, 464 may pass through the respective bracket 452, 462 and the respective vane assembly attachment web 131 or attachment flange 233, 236 in order to fix the guide vane assembly 110, 210, 310 in position.

Although the examples shown in FIGS. 16 to 20 include both radially inner and radially outer attachment rings 410, 420 and corresponding radially inner and radially outer attachment fixtures 430, 440, it will be appreciated that some examples may include just one of the radially inner attachment ring 410/attachment fixture 430 and the radially outer attachment ring 420/attachment fixture 440.

A guide vane assembly as described herein may comprise various optional features, only some of which are described below and elsewhere herein. For example, the aerofoil members 120, 220, 320 may comprise erosion and/or impact protection, for example from foreign objects such as birds. Such protection may be provided anywhere on the aerofoils, for example on the leading edges, which may be particularly susceptible to damage. Such protection may, for example, comprise resistant strips (such as metallic strips) bonded into the leading edge of the aerofoil members 120, 220, 320. Additionally or alternatively, an erosion protection coating may be applied to the surface of the guide vane assembly 110, 210, 310. Such an erosion protection coating may comprise, for example, a fluoroelastomer (such as Viton), a thermoplastic (such as PEEK), and/or or polyurethane (PU).

By way of further optional examples, to improve the high temperature performance the vanes could have a thermal barrier coating (TBC) applied. Optionally, a woven glass fibre skin could cover a part or the whole of the guide vane assembly 110, 210, 310 to improve the impact toughness. Glass fibre skin layers could be applied over vane assembly attachment webs 130, 230, 330 and/or attachment flanges 233, 236, 333, 336, for example to provide galvanic insulation from the inner and outer rings attachment rings and fixtures 410, 420, 430, 440, which may comprise a conductive material such as metal. If required, sacrificial layers (for example of glass fibre or carbon fibre) could be built up over parts of the guide vane assembly 110, 210, 310 that may require machining, in order to provide sacrificial material for machining to tolerance.

The guide vane assemblies 110, 210, 310 described herein may be used in any stator vane stage, for example any stator vane stage in a gas turbine engine. For example, the stator vane stage could be any stator vane stage of a compressor or turbine of a gas turbine engine including, but not limited to, a fan outlet guide vane stage.

Where reference is made herein to an engine or a gas turbine engine, it will be appreciated that this term may include a gas turbine engine/gas turbine engine installation and optionally any peripheral components to which the gas turbine engine may be connected to or interact with and/or any connections/interfaces with surrounding components, which may include, for example, an airframe and/or components thereof. The gas turbine engine may be any type of gas turbine engine, including, but not limited to, a turbofan (bypass) gas turbine engine, turbojet, turboprop, or open rotor gas turbine engine, and for any application, for example aircraft, industrial, and marine application.

It will be appreciated that many alternative configurations and/or arrangements of guide vane assemblies 210, 310, stator vane stages 100, attachment rings 410, 420 and attachment fixtures 430, 440 in addition to those explicitly described herein may fall within the scope of the invention. Furthermore, any feature described and/or claimed herein may be combined with any other compatible feature described in relation to the same or another embodiment.

I claim:

1. A guide vane assembly for a gas turbine engine stator vane stage comprising:
   a plurality of aerofoil members, each extending from a root to a tip;
   a single connection joining the tips or roots of two adjacent aerofoil members of the a plurality of aerofoil members, wherein:
      the single connection comprises a vane assembly attachment web integrally formed with the two adjacent aerofoil members either between the tips or between the roots of the two adjacent aerofoil members, the vane assembly attachment web being fixable to the stator vane stage;
      said two adjacent aerofoil members and vane assembly attachment web are formed using a fibre-reinforced composite material;
   a first attachment flange extending from a first end to a second end, wherein the second end of the first attachment flange is at a root or tip of one of the two adjacent aerofoil members at an end of said one of the two adjacent aerofoil members that is radially opposite to where the vane attachment web assembly is formed; and
   a second attachment flange extending from a first end to a second end, wherein the second end of the second attachment flange is at a root or tip of another one of the two adjacent aerofoil members at an end of said other one of the adjacent two aerofoil members that is radially opposite to where the vane attachment web assembly is formed.

2. A guide vane assembly according to claim 1, wherein a circumferential extent of the guide vane assembly, with respect to a rotational axis of the gas turbine engine is defined by the first and second ends.

3. A guide vane assembly according to claim 1, wherein the first and second ends of the respective first and second attachment flanges are within a circumferential extent of the guide vane assembly with respect to a rotational axis of the gas turbine engine.

4. A guide vane assembly according to any one of claim 1, wherein the fibre-reinforced composite material comprises fibres that extend continuously from the first end of the first attachment flange to the first end of the second attachment flange passing through the two adjacent aerofoil members and the vane assembly attachment web.

5. A guide vane assembly according to claim 1, wherein the vane assembly attachment web has radially inner and outer surfaces with respect to a rotational axis of the gas turbine engine, one of the inner and outer surfaces is shaped to cooperate with an attachment ring of the stator vane stage to allow the guide vane assembly to be located and fixed to the attachment ring.

6. A guide vane assembly according to claim 5, wherein the other of the radially inner and outer surfaces is shaped to cooperate with an attachment fixture including a ring or a ring segment allowing the guide vane assembly to be located and fixed between the attachment ring and the attachment fixture.

7. A guide vane assembly according to claim 1, wherein:
   each aerofoil member has a pressure surface and a suction surface; and
   both the pressure surface and suction surface of the two adjacent aerofoil members in the guide vane assembly are formed using a single set of fibres.

8. A guide vane assembly according to claim 1 comprising only two aerofoil members.

9. A guide vane assembly according to claim 1 comprising more than two aerofoil members.

10. A stator vane stage for a gas turbine engine comprising:
    at least one guide vane assembly according to claim 1;
    an inner attachment ring located at the roots and/or an outer attachment ring located at the tips of the plurality of aerofoil members; and
    an inner and/or an outer attachment fixture each including a ring or a ring segment, wherein the vane assembly attachment web is used to attach each guide vane assembly to the inner attachment ring using the inner attachment fixture and/or to the outer attachment ring using the outer attachment fixture.

11. A stator vane stage for a gas turbine engine stator vane stage comprising:
    a guide vane assembly including:
       a plurality of aerofoil members, each extending from a root to a tip;
       a single connection joining the tips or roots of two adjacent aerofoil members of the a plurality of aerofoil members, wherein:
          the single connection comprises a vane assembly attachment web integrally formed with the two adjacent aerofoil members either between the tips or between the roots of the two adjacent aerofoil members, the vane assembly attachment web being fixable to the stator vane stage;
          said adjacent aerofoil members and vane assembly attachment web are formed using a fibre-reinforced composite material;
       the guide vane assembly extends from a first end to a second end, the first end and the second end being axially spaced apart from each other;
    a first attachment flange extending from the first end to the tip or root of one of the two adjacent aerofoil members radially opposite of where the vane attachment assembly web is formed; and
    a second attachment flange extending from the second end to the tip or root of another one of the two adjacent aerofoil members radially opposite of where the vane attachment assembly web is formed;
    at least one of an inner attachment ring located at the roots of the plurality of aerofoil members and an outer attachment ring located at the tips of the plurality of aerofoil members,
       the first and second attachment flanges being axially spaced apart from each other, wherein one of the at least one of the inner attachment ring and the outer attachment ring has a castellated shape having recesses and crests, each recess being shaped to receive the vane assembly attachment web of the guide vane assembly.

12. A stator vane stage according to claim 11, wherein the at least one of the inner attachment ring and the outer attachment ring includes the inner attachment ring, and the inner attachment ring has a castellated shape and the stator vane stage comprises an inner attachment fixture that has at least one fixing element including a ring or ring segment located within a corresponding recess, each fixing element having a circumferentially extending gas-washed surface that covers one or more of the recesses.

13. A stator vane stage according to claim 11, wherein the at least one of the outer attachment ring and the outer attachment ring includes the outer attachment ring, and the outer attachment ring has a castellated shape and the stator vane stage comprises an outer attachment fixture that has at least one fixing element including a ring or ring segment located within a corresponding recess, each fixing element having a circumferentially extending gas-washed surface that covers one or more of the recesses.

14. A stator vane stage according to claim 11, wherein the other of the inner attachment ring and the outer attachment ring has a castellated shape having recesses and crests, each recess being shaped to receive the first attachment or second attachment flange of the guide vane assembly.

15. A stator vane stage according to claim 11, wherein each crest forms a circumferentially extending gas-washed surface between aerofoil members.

* * * * *